United States Patent
Kumagai

(10) Patent No.: US 9,470,160 B2
(45) Date of Patent: Oct. 18, 2016

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Noriaki Kumagai, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/892,026

(22) PCT Filed: May 15, 2014

(86) PCT No.: PCT/JP2014/002567
§ 371 (c)(1),
(2) Date: Nov. 18, 2015

(87) PCT Pub. No.: WO2014/188684
PCT Pub. Date: Nov. 27, 2014

(65) Prior Publication Data
US 2016/0108832 A1    Apr. 21, 2016

(30) Foreign Application Priority Data
May 20, 2013    (JP) .................................. 2013-106158

(51) Int. Cl.
*F02D 41/00*    (2006.01)
*B60K 6/445*    (2007.10)
*B60W 10/06*    (2006.01)
(Continued)

(52) U.S. Cl.
CPC ........... *F02D 41/0005* (2013.01); *B60K 6/445* (2013.01); *B60W 10/06* (2013.01); *B60W 10/08* (2013.01); *B60W 20/00* (2013.01); *B60W 20/10* (2013.01); *B60W 20/13* (2016.01); *B60W 30/194* (2013.01); *F02B 63/04* (2013.01); *F02D 41/045* (2013.01); *F02D 41/047* (2013.01); *F02D 41/10* (2013.01); *F02D 41/12* (2013.01); *F02D 41/26* (2013.01); *B60W 2710/0605* (2013.01);
(Continued)

(58) Field of Classification Search
None
See application file for complete search history.

(56) References Cited

U.S. PATENT DOCUMENTS

2009/0271097 A1    10/2009 Kasai et al.

FOREIGN PATENT DOCUMENTS

JP    H06-2589 A    1/1994
JP    2009-264266 A    11/2009

*Primary Examiner* — Thomas Tarcza
*Assistant Examiner* — Garrett Evans
(74) *Attorney, Agent, or Firm* — Kenyon & Kenyon LLP

(57) ABSTRACT

It is intended to suppress formation of any excessive rich air-fuel ratio of the air-fuel mixture caused by adhered fuel on an inner wall surface of an intake passage of an internal combustion engine. A throttle valve driving unit is controlled so that if a variation amount of decrease in output of the internal combustion engine exceeds a predetermined variation amount when the output of the internal combustion engine is smaller than a predetermined output in a non-warm-up state in which the temperature of the internal combustion engine is equal to or lower than a predetermined temperature, then an opening degree of the throttle valve becomes a predetermined increased opening degree which is increased as compared with a standard opening degree as an opening degree of the throttle valve to be provided if the variation amount does not exceed the predetermined variation amount. Further, the electric power generated by a generator is stored in an electricity storage apparatus corresponding to increase in output of the internal combustion engine based on an amount of increase from the standard opening degree to the predetermined increased opening degree.

4 Claims, 9 Drawing Sheets

(51) Int. Cl.
  *B60W 20/00* (2016.01)
  *F02D 41/04* (2006.01)
  *F02D 41/12* (2006.01)
  *B60W 10/08* (2006.01)
  *B60W 30/194* (2012.01)
  *F02B 63/04* (2006.01)
  *F02D 41/10* (2006.01)
  *F02D 41/26* (2006.01)

(52) U.S. Cl.
  CPC ......... *Y02T10/6239* (2013.01); *Y02T 10/6286* (2013.01); *Y10S 903/905* (2013.01)

CONTROL APPARATUS FOR INTERNAL COMBUSTION ENGINE

CROSS-REFERENCE TO RELATED APPLICATIONS

This is a national phase application based on the PCT International Patent Application No. PCT/JP2014/002567 filed May 15, 2014, claiming priority to Japanese Patent Application No. 2013-106158 filed May 20, 2013, the entire contents of both of which are incorporated herein by reference.

TECHNICAL FIELD

The present invention relates to a control apparatus for an internal combustion engine.

BACKGROUND ART

When the fuel injection is performed in an intake passage of an internal combustion engine, there is such a possibility that the fuel may adhere to an inner wall surface of the intake passage. Therefore, if the adhered fuel is evaporated and contained in the intake gas, then the air-fuel ratio of the air-fuel mixture is consequently in an excessively rich state in the internal combustion engine, and any influence may be exerted on the stability of the combustion and the efficiency of the exhaust gas purification by a three way catalyst etc. in some cases. In order to suppress the influence exerted by the fuel adhered to the inner wall surface of the intake passage as described above, for example, as described in PTL 1, a technique in relation to the fuel injection control based on a detected value of a pressure sensor for detecting the pressure in the intake passage is disclosed. In the case of this technique, the pressure change amount in the intake passage and the dead zone value of the sensor during the deceleration are compared with each other to calculate the correction amount of the fuel injection amount. Accordingly, the fuel injection control is performed differently between when the rapid deceleration is performed and when the mild deceleration is performed, and it is intended to suppress the influence of the adhered fuel.

CITATION LIST

Patent Literature

PTL 1: JP6-2589A;
PTL 2: JP2009-264266A.

SUMMARY OF INVENTION

Technical Problem

There is such a tendency that a larger amount of the fuel adheres to the inner wall surface of the intake passage when the engine temperature of the internal combustion engine is relatively low. If the internal combustion engine is subjected to the deceleration operation in the situation as described above, then the throttle valve of the intake passage is closed, and hence the interior of the intake passage is in a negative pressure state. Further, in particular, if the interior of the intake passage is in the negative pressure state, and the change amount of the negative pressure is increased, then the boiling point of the fuel adhered to the inner wall surface of the intake passage is suddenly lowered, and a large amount of the adhered fuel is evaporated with ease. As a result, the air-fuel ratio of the air-fuel mixture becomes excessively rich in the internal combustion engine.

If the air-fuel ratio of the air-fuel mixture becomes excessively rich as described above, then the stability of the output of the internal combustion engine may be deteriorated, and the efficiency of the exhaust gas purification by the exhaust gas purification catalyst may be also affected on account of the disturbance of the air-fuel ratio of the exhaust gas.

The present invention has been made taking the foregoing problem into consideration, an object of which is to provide a control apparatus with which it is intended to suppress formation of any excessively rich air-fuel ratio of the air-fuel mixture caused by the adhered fuel on an inner wall surface of an intake passage of an internal combustion engine.

Solution to Problem

In the present invention, in order to solve the problem as described above, the following construction is adopted. That is, the opening degree control is performed for a throttle valve, and the electricity storage control is performed for the generated electric power by the output of an internal combustion engine, when the negative pressure state in an intake passage of the internal combustion engine is in a predetermined state, i.e., in a state in which the adhered fuel on the inner wall surface of the intake passage may be evaporated in a relatively large amount. The inventor of the present invention has been found out the fact that it is possible to realize a proper air-fuel ratio of the air-fuel mixture in the internal combustion engine and it is possible to realize the stable maintenance of the output of the internal combustion engine by adopting the construction.

Specifically, the present invention resides in a control apparatus for an internal combustion engine having a generator which generates an electric power by using an output of the internal combustion engine and a electricity storage apparatus which stores the electric power generated by the generator; the control apparatus for the internal combustion engine comprising a temperature acquiring unit which acquires a temperature of the internal combustion engine; a throttle valve driving unit which drives a throttle valve to open/close the throttle valve provided in an intake passage of the internal combustion engine; a throttle valve opening degree control unit which controls the throttle valve driving unit so that if a variation amount of decrease in output of the internal combustion engine exceeds a predetermined variation amount when the output of the internal combustion engine is smaller than a predetermined output in a non-warm-up state in which the temperature of the internal combustion engine acquired by the temperature acquiring unit is equal to or lower than a predetermined temperature, an opening degree of the throttle valve becomes a predetermined increased opening degree which is increased as compared with a standard opening degree as an opening degree of the throttle valve to be provided if the variation amount does not exceed the predetermined variation amount; and an electricity storage control unit which stores the electric power generated by the generator in the electricity storage apparatus corresponding to increase in output of the internal combustion engine based on an amount of increase from the standard opening degree to the predetermined increased opening degree brought about by the throttle valve opening degree control unit.

The internal combustion engine, which is the control target of the control apparatus, has the generator which performs the power generation by using the output of the internal combustion engine and the electricity storage apparatus which stores the generated electric power. In this context, the generator may be a generator which has not only the function to convert the output of the internal combustion engine into the electric energy but also the function as a motor generator to output the driving force by using the electric energy supplied from the outside, for example, the electric energy supplied from the electricity storage apparatus or any other power source apparatus. In other words, in this case, the generator is a motor which is capable of generating the electric power by using the output of the internal combustion engine and which is capable of outputting the driving force by supplying the electric power stored in the electricity storage apparatus. Further, the control apparatus can be also applied to such a form that the internal combustion engine is mounted in a hybrid vehicle which has the internal combustion engine and the motor as driving sources.

In the control apparatus for the internal combustion engine according to the present invention, the throttle valve driving unit is controlled by the throttle valve opening degree control unit when the internal combustion engine is placed in the non-warm-up state in which the temperature thereof is equal to or lower than the predetermined temperature. The predetermined temperature is a threshold value at which it is judged that the adhered fuel amount is relatively increased on the inner wall surface of the intake passage of the internal combustion engine when the internal combustion engine is at a temperature of equal to or lower than the predetermined temperature to cause such a possibility that the air-fuel ratio of the air-fuel mixture becomes excessively rich in the internal combustion engine. Specifically, as for the predetermined temperature, it is possible to apply the engine temperature provided in the cold state of the internal combustion engine or the engine temperature provided in the semi-warm-up state before the completion of the warming-up. The predetermined temperature can be appropriately set while considering the characteristics of the internal combustion engine. There is such a possibility that a relatively large amount of the fuel may adhere to the inner wall surface of the intake passage of the internal combustion engine which is in the non-warm-up state. The inventor of the present invention has found out such a tendency that if the interior of the intake passage is in a predetermined negative pressure state in the situation as described above, then a large amount of the adhered fuel is evaporated, and the fuel flows into the internal combustion engine.

In this context, the predetermined negative pressure state, which is provided as the condition for the adhered fuel to be easily evaporated in the non-warm-up state, is the low output state in which the output of the internal combustion engine is smaller than the predetermined output, wherein the variation amount (fluctuation amount) is lowered relatively steeply in this state while exceeding the predetermined variation amount during the decrease in output of the internal combustion engine in the situation as described above. If the output of the internal combustion engine is smaller than the predetermined output, then the throttle valve is adjusted to the valve closing side by the throttle valve driving unit, and the negative pressure state, in which the adhered fuel is easily evaporated, may be formed. Further, if the variation amount of the decrease in output of the internal combustion engine exceeds the predetermined variation amount, there is such a tendency that the valve closing speed of the throttle valve is increased, and the negative pressure is suddenly increased in the intake passage. Therefore, when the negative pressure state is formed as described above, it is considered that the evaporation amount of the adhered fuel is relatively large, and the evaporation speed is quickened. Therefore, the air-fuel ratio of the air-fuel mixture tends to become excessively rich in the internal combustion engine. In view of the above, in the present invention, when the condition, under which the air-fuel ratio of the air-fuel mixture tends to become excessively rich as described above, is established, the throttle valve opening degree control unit controls the throttle valve driving unit so that the opening degree of the throttle valve is the predetermined increased opening degree in which the opening degree of the throttle valve is increased to the opening side as compared with the standard opening degree to be provided when the condition is not established.

Accordingly, the opening degree of the throttle valve is the predetermined increased opening degree in the situation in which a large amount of the adhered fuel on the inner wall surface of the intake passage tends to be evaporated, and it is possible to thereby mitigate the negative pressure in the intake passage. Thus, it is possible to suppress the evaporation of the adhered fuel. Therefore, it is possible to suppress the formation of any excessively rich air-fuel ratio of the air-fuel mixture in the internal combustion engine in accordance with the control of the throttle valve opening degree control unit as described above.

On the other hand, it is possible to suppress the formation of any excessively rich air-fuel ratio of the air-fuel mixture in the internal combustion engine by allowing the opening degree of the throttle valve to be the predetermined increased opening degree as described above. However, as a result thereof, the increase in output of the internal combustion engine is exhibited by the increase in the intake amount, i.e., the output, which is not less than the output required for the internal combustion engine, is exhibited. Accordingly, in the present invention, the increase in output of the internal combustion engine, which is based on the amount of increase from the standard opening degree to the predetermined increased opening degree, is subjected to the power generation performed by the generator by the electricity storage control unit. The generated electric power is stored in the electricity storage apparatus. Accordingly, the amount, by which the required output for the internal combustion engine is exceeded, is stored as the electric energy in the electricity storage apparatus. Therefore, as a result, it is possible to exhibit the output of the internal combustion engine corresponding to the request.

As described above, in the control apparatus for the internal combustion engine according to the present invention, it is possible to establish both of the suppression of the excessively rich air-fuel ratio of the air-fuel mixture caused by the adhered fuel on the inner wall surface of the intake passage of the internal combustion engine and the stabilization of the output of the internal combustion engine.

In this context, in the control apparatus for the internal combustion engine as described above, the predetermined output may be an engine output which is provided as a threshold value to switch a load operation and an idle operation in the internal combustion engine; and the predetermined increased opening degree may be an opening degree increased as compared with the standard opening degree at which the opening degree of the throttle valve, which is provided during the idle operation of the internal combustion engine, is an opening degree of the throttle valve during the idle operation of the internal combustion engine provided when the variation amount of the decrease in output of the internal combustion engine does not exceed the predetermined variation amount. When the deceleration is performed such that the operation of the internal combustion engine is switched from the load operation, i.e., the operation performed corresponding to the output request for the internal combustion engine to the idle operation, then the throttle valve is closed relatively greatly, and the valve closing speed is relatively quick in some cases. In such a situation, the evaporation speed of the adhered fuel is quickened with ease. In view of the above, the control performed by the control apparatus according to the present invention can be also preferably applied when the operation is switched from the load operation to the idle operation.

In this context, the control apparatus for the internal combustion engine as described above may further comprise an acquiring unit which acquires, as an allowable charge amount, an electric power amount capable of being charged in the electricity storage apparatus. Further, the smaller the allowable charge amount acquired by the acquiring unit is, the smaller the predetermined increased opening degree the throttle valve opening degree control unit adjusts is, and the lower the change speed of the throttle valve opening degree to arrive at the adjusted predetermined increased opening degree the throttle valve opening degree control unit makes is. When the allowable charge amount is decreased, the margin or allowance is decreased to store, as the electric energy, the increase in output of the internal combustion engine brought about by the adjustment of the throttle valve to the predetermined increased opening degree. Accordingly, the predetermined increased opening degree is adjusted depending on the allowable charge amount as described above so that the change speed to arrive at the predetermined increased opening degree is controlled. Thus, the excessively rich air-fuel ratio of the air-fuel mixture can be suppressed as far as possible in the internal combustion engine within a range in which the output of the internal combustion engine can be stably maintained.

The control apparatus for the internal combustion engine as described above may be constructed such that the control of the throttle valve driving unit, which is to be performed by the throttle valve opening degree control unit, is prohibited if the allowable charge amount is zero in the electricity storage apparatus. Accordingly, it is possible to avoid the output change of the internal combustion engine which would be otherwise accompanied by the control of the throttle valve opening degree control unit.

Advantageous Effects of Invention

According to the present invention, it is possible to suppress the formation of any excessively rich air-fuel ratio of the air-fuel mixture which would be otherwise caused by the adhered fuel on the inner wall surface of the intake passage of the internal combustion engine.

DESCRIPTION OF EMBODIMENTS

A specified embodiment of the present invention will be explained below on the basis of the drawings. For example, the dimension, the material, the shape, and the relative arrangement of constitutive parts or components described in the embodiment of the present invention are not intended to limit the technical scope of the invention only thereto, unless specifically noted.

Example 1

Figure 1:
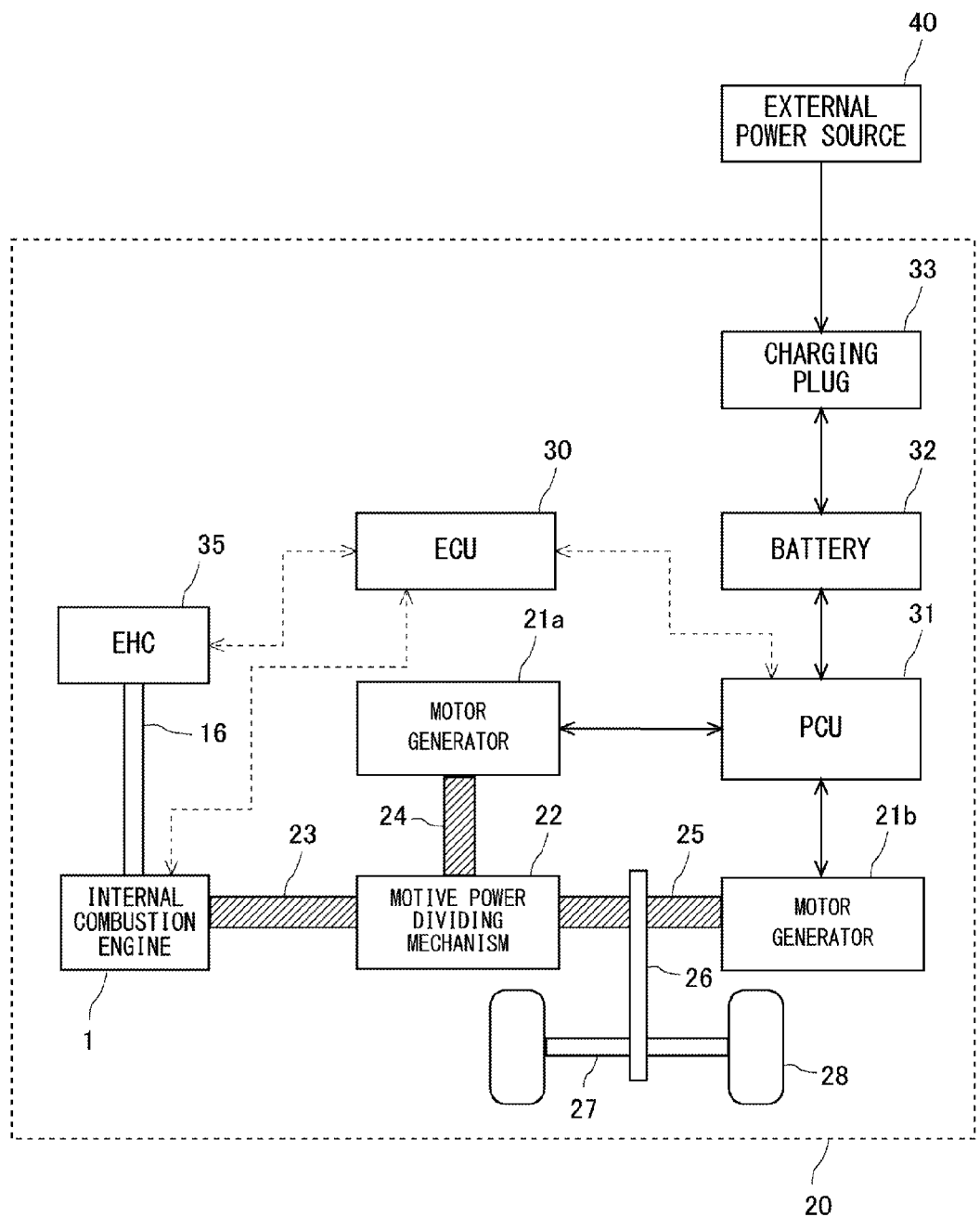
FIG. 1 shows a schematic arrangement of a hybrid vehicle which carries an internal combustion engine as a control target of a control apparatus for the internal combustion engine according to the present invention.

FIG. 1 shows a schematic arrangement of a hybrid vehicle 20 provided with a hybrid system having an internal combustion engine which has a control apparatus according to the example of the present invention and two motor generators (hereinafter simply referred to as "motors") as driving sources distinct therefrom. The hybrid vehicle 20 has the internal combustion engine 1 as the main power source, and the hybrid vehicle 20 has the motor 21a and the motor 21b as the auxiliary power sources.

At first, the hybrid system will be explained. A crank shaft of the internal combustion engine 1 is connected to an output shaft 23, and the output shaft 23 is connected to a motive power dividing mechanism 22. The motive power dividing mechanism 22 is connected to the motor 21a via a motive power transmitting shaft 24, and the motive power dividing mechanism 22 is also connected to the motor 21b via a motive power transmitting shaft 25. In this arrangement, the motive power dividing mechanism 22 switches the transmission of, for example, the outputs of the internal combustion engine and the auxiliary power sources by means of a planetary gear mechanism. A speed reducer 26 is connected to the motive power transmitting shaft 25 connected to the motor 21b. A driving wheel 28 is connected to the speed reducer 26 via a drive shaft 27. The speed reducer 26 is constructed by combining a plurality of gears, wherein the number of revolutions of the motive power transmitting shaft 25 is subjected to the deceleration, and the outputs from the internal combustion engine 1, the motor 21a, and the motor 21b are transmitted to the drive shaft 27.

In this arrangement, the motors 21a, 21b are electrically connected to PCU (Power Control Unit) 31 including an unillustrated inverter, and PCU 31 is further electrically connected to a battery 32. PCU 31 is an electric power control unit constructed such that the DC electric power, which is taken out from the battery 32, is converted into the AC electric power which is supplied to the motors 21a, 21b, and the AC electric power, which is generated by the motors 21a, 21b, is converted into the DC electric power which is supplied to the battery 32. In particular, each of the motors 21a, 21b is constructed by an electric motor of the AC synchronization type, wherein the torque is generated when the excitation current is applied, while the electric power is generated by converting the kinetic energy into the electric energy when the torque is applied from the outside, for example, when the kinetic energy is inputted from the internal combustion engine 1 via the motive power dividing mechanism 22. The generated electric power is supplied to the battery 32 via PCU 31. Further, the motor 21b acts as a generator when the vehicle is decelerated, and the motor 21b can perform the so-called regenerative power generation such that the kinetic energy, which is transmitted from the driving wheel 28 via the drive shaft 27 and the speed reducer 26 to the motive power transmitting shaft 25, is converted into the electric energy. The electric power, which is generated thereby, is also supplied to the battery 32 via PCU 31. Further, the hybrid vehicle 20 shown in FIG. 1 is a so-called plug-in hybrid vehicle which is provided with a charging plug 33 so that the electric power can be supplied from an external power source 40.

Figure 2:
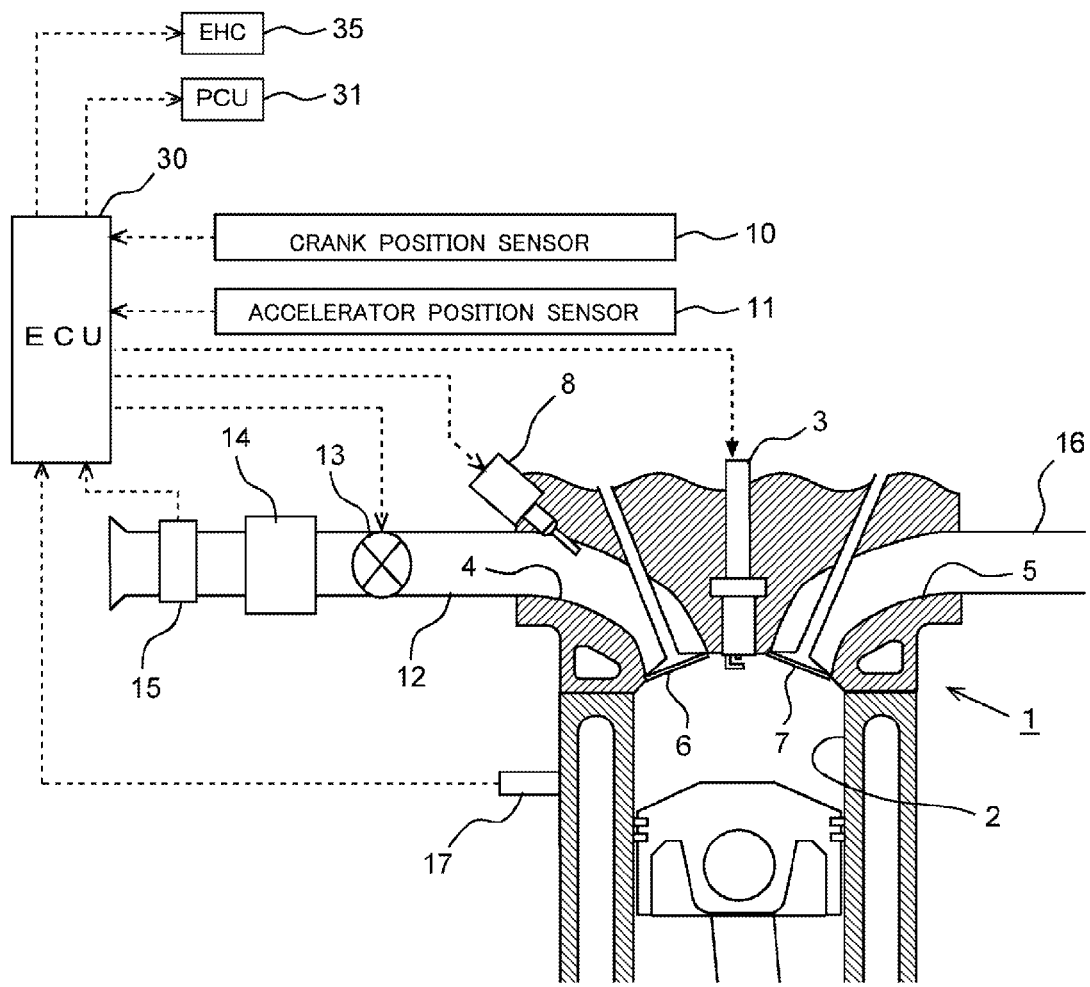
FIG. 2 shows a schematic arrangement of the control apparatus for the internal combustion engine shown in FIG. 1.

Next, the internal combustion engine 1 mounted in the hybrid vehicle 20 will be explained on the basis of FIGS. 1 and 2. The internal combustion engine 1 is an internal combustion engine (gasoline engine) of the spark ignition type having a plurality of cylinders. FIG. 2 shows only one cylinder of the plurality of cylinders of the internal combustion engine 1. A spark plug 3 is attached to each of the cylinders 2 of the internal combustion engine 1. The internal combustion engine 1 is provided with an intake port 4 and an exhaust port 5. The intake port 4 is a passage for introducing the air and the fuel into the cylinder 2 of the internal combustion engine 1, and the intake port 4 is opened/closed by an intake valve 6. The exhaust port 5 is a passage for discharging the gas (burned gas) subjected to the combustion in the cylinder 2 from the inside of the cylinder 2, and the exhaust port 5 is opened/closed by an exhaust valve 7.

The intake port 4 is connected to an intake passage 12. The fresh air (air), which is intaken from the atmospheric air, is introduced into the intake port 4 by the intake passage 12. A fuel injection valve 8 is attached so that the fuel can be injected into the intake port 4. Further, a throttle valve 13 is provided in the intake passage 12. The throttle valve 13 is a valve mechanism for adjusting the amount of the air to be introduced into the cylinder 2 by changing the cross-sectional area of the passage in the intake passage 12. A supercharger 14 is provided in the intake passage 12 upstream from the throttle valve 13. The supercharger 14 is an apparatus for compressing the air, and the supercharger 14 is, for example, a centrifugal supercharger (turbo charger) by using the thermal energy of the exhaust gas or a mechanical supercharger by using the output of the internal combustion engine 1. An air flow meter 15 is provided in the intake passage on the upstream side from the supercharger 14.

The exhaust port 5 is connected to an exhaust passage 16. The exhaust gas, which is discharged from the inside of the cylinder 2 to the exhaust port 5, is introduced to an unillustrated tailpipe by the exhaust passage 16. The exhaust passage 16 is provided with EHC (electric heating catalyst or electrically heated catalyst) 35 in order to purify the exhaust gas. The electric heating catalyst 35 has a catalyst having the oxidizing function carried on a catalyst carrier of a material which serves as an electric resistor and which generates the heat by applying the electric power. The catalyst carrier has a plurality of passages which extend in the direction of the flow of the exhaust gas and which have a honeycomb-shaped cross section perpendicular to the direction of the flow of the exhaust gas. When the exhaust gas flows through the passages, the exhaust gas is purified by the carried catalyst. The catalyst can be exemplified, for example, by an oxidation catalyst (oxidizing catalyst), a three way catalyst, an absorption reduction type NOx catalyst, and a selective reduction type NOx catalyst. It is also allowable to provide an electric heating catalyst by providing a catalyst on the downstream side from a heat generating member which generates the heat by applying the electric power.

The hybrid vehicle 20, which has the hybrid system constructed as described above, is provided with ECU 30 which is an electric control unit for controlling PCU 31 which controls the giving and receiving of the electric power between the battery 32 and the internal combustion engine 1 and the motors 21a, 21b. ECU 30 is an electric control unit which is composed of, for example, CPU, ROM, RAM, and backup RAM, wherein the fuel injection amount from the fuel injection valve 8 is controlled and the electric power supply to each of the motors is controlled by the aid of PCU 31 in order that the torque, which is required by the hybrid vehicle 20, is exhibited by the internal combustion engine 1 and the motors 21a, 21b. Further, ECU 30 performs, for example, the monitoring of the electricity storage amount in the battery 32 by the aid of PCU 31. For example, if ECU 30 judges that the electricity storage amount of the battery 32 is lowered, then the power generation is performed by transmitting the engine output of the internal combustion engine 1 to the motor 21a, and the electricity generated by the motor 21a is stored in the battery 32 by the aid of PCU 31.

ECU 30 is also electrically connected to various sensors which relate to the internal combustion engine 1 mounted in the hybrid vehicle 20. For example, ECU 30 is electrically connected, for example, to a crank position sensor 10, an accelerator position sensor 11, the air flow meter 15, and a water temperature sensor 17. The crank position sensor 10 is a sensor which outputs the electric signal correlated with the rotation position of the output shaft (crank shaft) of the internal combustion engine 1. The accelerator position sensor 11 is a sensor which outputs the electric signal correlated with the operation amount (accelerator opening degree) of an accelerator pedal. The water temperature sensor 17 is a sensor which outputs the electric signal correlated with the temperature of the cooling water circulating in the internal combustion engine 1. The air flow meter 15 is a sensor which is attached to the intake passage 12 upstream from the supercharger 14 and which outputs the electric signal correlated with the amount of the air allowed to flow through the intake passage 12 (intake air amount of the internal combustion engine 1). Therefore, ECU 30 can grasp, for example, the engine rotation speed of the internal combustion engine, the engine output, the engine temperature, and the intake flow rate on the basis of the outputs from the sensors.

Further, ECU 30 controls various apparatuses or devices including, for example, the spark plug 3, the fuel injection valve 8, and the throttle valve 13. For example, ECU 30 controls the fuel injection valve 8 and the throttle valve 13 to adjust the fuel injection amount and the intake flow rate so that the air-fuel ratio of the air-fuel mixture is approximately the stoichiometric air-fuel ratio in the internal combustion engine 1 by means of the fuel injection on the basis of, for example, the engine load and the engine rotation speed of the internal combustion engine 1. Further, ECU 30 is also electrically connected to an unillustrated temperature sensor for detecting the temperature of the electric heating catalyst 35. The electric power application is controlled with respect to the electric heating catalyst 35 so that the catalyst temperature is a temperature suitable for the exhaust gas purification on the basis of the detected temperature.

In the internal combustion engine 1 mounted in the hybrid vehicle 20 constructed as described above, the fuel injection is performed from the fuel injection valve 8 provided in the vicinity of the intake port 4. Therefore, the fuel tends to adhere to the inner wall surfaces of the intake port 4 and the intake passage 12 (hereinafter referred to as "intake passage or the like"). In particular, when the engine temperature of the internal combustion engine is a relatively low temperature, the evaporation of the fuel becomes dull. Therefore, the adhesion amount of the fuel adhered to the inner wall surface of the intake passage or the like is increased. If the internal combustion engine 1 is decelerated in the state in which the adhered fuel exists as described above, the throttle valve 13 is subjected to the opening degree control to the valve closing side in order to decrease or narrow down the engine output. If such a situation arises, a state is given, in which the pressure in the intake passage or the like is the negative pressure principally in the intake stroke (hereinafter referred to as "negative pressure state"). In the negative pressure state, the boiling point of the adhered fuel on the inner wall surface of the intake passage or the like is lowered, and hence the fuel is evaporated with ease. The evaporated adhered fuel is contained in the intake gas to be introduced into the internal combustion engine 1 in addition to the fuel directly injected from the fuel injection valve 8. The air-fuel ratio of the air-fuel mixture is in the excessively rich state in the internal combustion engine 1.

Figure 3:
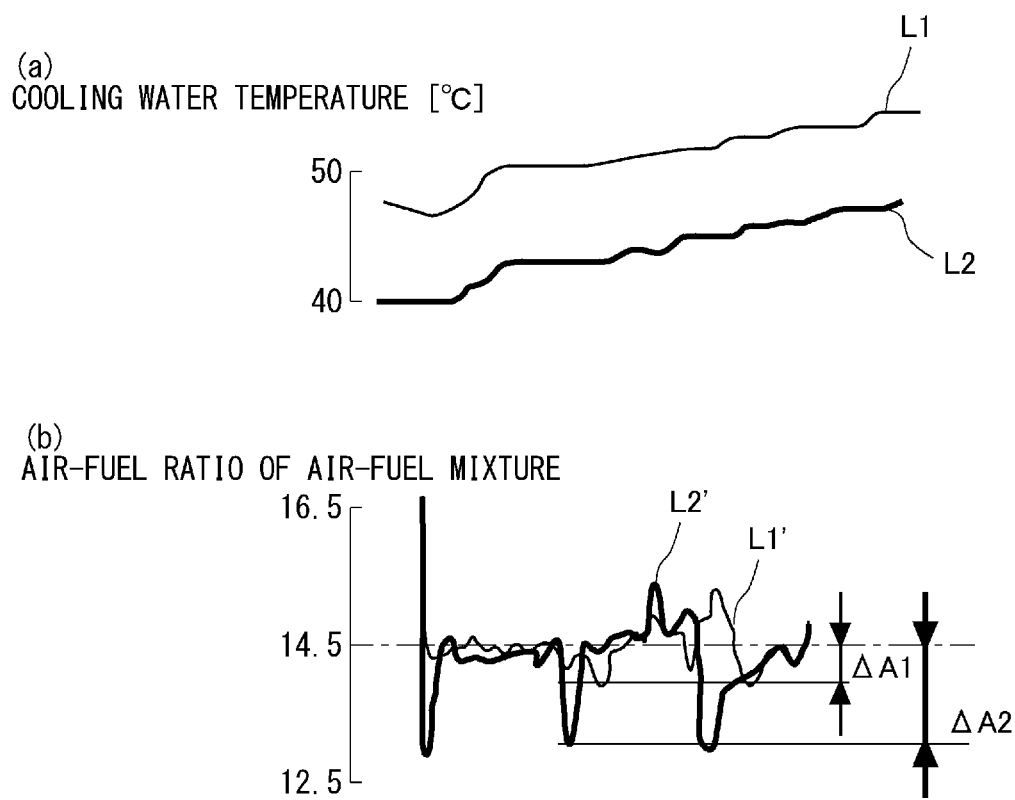
FIG. 3(a) and FIG. 3(b) show the transition or change of the cooling water temperature in the internal combustion engine and the transition or change of the air-fuel ratio of the air-fuel ratio in the internal combustion engine, respectively.

An explanation will be made in detail on the basis of FIG. 3(a), FIG. 3(b) and FIG. 4 about the formation of the excessively rich state of the air-fuel ratio of the air-fuel mixture resulting from the negative pressure state. FIG. 3(a) shows the transition of the cooling water temperature of the internal combustion engine 1, and FIG. 3(b) shows the transition of the air-fuel ratio of the air-fuel mixture in the internal combustion engine 1. The air-fuel ratio of the air-fuel mixture, which is provided when the cooling water temperature transition of a line L1 is indicated in the upper part (a), follows along the transition of a line L1'. The air-fuel ratio of the air-fuel mixture, which is provided when the cooling water temperature transition of a line L2 is indicated in the upper part (a), follows along the transition of a line L2'. As shown in FIG. 3(a), the cooling water temperature transition of the line L1 is disposed on the high temperature side as compared with the cooling water temperature transition of the line L2. Therefore, the transition of the line L1 is sometimes referred to as "cooling water temperature transition at high temperature", and the transition of the line L2 is sometimes referred to as "cooling water temperature transition at low temperature". As for the operation state of the internal combustion engine 1 during the period in which the temperature transition is provided as described above, the engine temperature is gradually raised consequently by appropriately performing the acceleration/deceleration. Further, the rate of increase of the cooling water temperature in the transition of the line L1 is approximately the same as the rate of increase of the cooling water temperature in the transition of the line L2.

In the foregoing period shown in FIG. 3(a) and FIG. 3(b), the deceleration operation is included in the operation of the internal combustion engine 1. Therefore, it is possible to confirm, from FIG. 3(b), such a tendency that the adhered fuel adhered to the inner wall surface of the intake passage or the like is evaporated during the deceleration for the reason as described above, and the air-fuel ratio of the air-fuel mixture is greatly varied temporarily toward the rich side. Further, the variation amount DA2 of the air-fuel ratio of the air-fuel mixture toward the rich side corresponding to the cooling water temperature transition at low temperature is larger than the variation amount DA1 of the air-fuel ratio of the air-fuel mixture toward the rich side corresponding to the cooling water temperature transition at high temperature. In other words, it is possible to understand such a tendency that when the engine temperature of the internal combustion engine 1 is low, the air-fuel ratio of the air-fuel mixture is varied to the air-fuel ratio on the richer side resulting from the adhered fuel during the deceleration. The variation amount has the value which is calculated by using a peak value as the extent of variation toward the rich side from the air-fuel ratio in the vicinity of the stoichiometric ratio (14.5 in this example) at which the air-fuel ratio of the air-fuel mixture is to be intrinsically established in relation to the internal combustion engine 1.

Figure 4:
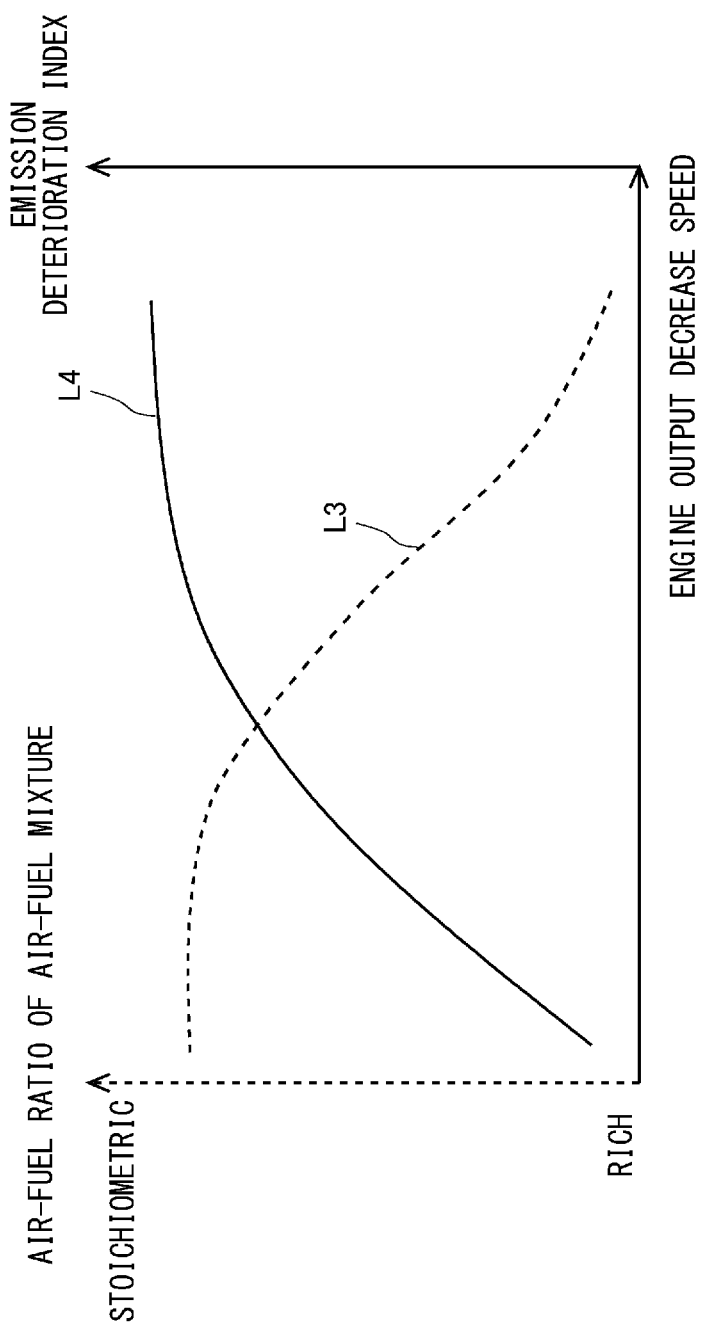
FIG. 4 shows a correlation between the engine output decrease speed of the internal combustion engine mounted in the hybrid vehicle shown in FIG. 1 and the air-fuel ratio of the air-fuel mixture in the internal combustion engine, and a correlation between the engine output decrease speed of the internal combustion engine and the deterioration index of the emission from the internal combustion engine.

In FIG. 4, a line L3 indicates the correlation between the decrease speed of the engine output of the internal combustion engine 1, i.e., the amount of decrease of the engine output per unit time and the air-fuel ratio of the air-fuel mixture in the internal combustion engine 1 in a state in which the engine temperature of the internal combustion engine 1 is relatively low, and a line L4 indicates the correlation between the decrease speed of the engine output of the internal combustion engine 1 and the emission deterioration index. In this example, the emission deterioration index is defined as the total of the HC amount and the NOx amount contained in the exhaust gas. The emission deterioration index quantitatively indicates that the larger the numerical value of the emission deterioration index is, the more deteriorated the emission of the internal combustion engine 1 is. As shown in FIG. 4, the larger the engine output decrease speed of the internal combustion engine 1 is, i.e., the more suddenly the engine output decreases, the more suddenly the negative pressure in the intake passage or the like increases. Therefore, the evaporation amount of the adhered fuel per unit time increases. As a result, as the engine output decrease speed of the internal combustion engine 1 is more increased, the air-fuel ratio of the air-fuel mixture is more easily varied toward the excessively rich side in the internal combustion engine 1, and the emission of the internal combustion engine 1 is deteriorated.

When the air-fuel ratio of the air-fuel mixture is in the excessively rich state during the deceleration of the internal combustion engine 1, for example, if a three way catalyst is utilized for the electric heating catalyst 35, then the air-fuel ratio of the exhaust gas is deviated from the purification window, and hence it is difficult to perform the effective exhaust gas purification. Even if any catalyst other than the three way catalyst is used, the air-fuel ratio of the exhaust gas is suddenly varied toward the rich side with ease, and hence it is difficult to perform the effective exhaust gas purification in the same manner as described above. Accordingly, the deceleration control is performed in order to suppress the formation of any excessively rich air-fuel ratio of the air-fuel mixture as far as possible during the deceleration of the internal combustion engine 1 by executing a control program stored in ECU 30. The deceleration control is the control to be performed during the period in which the internal combustion engine 1 is operated in the hybrid vehicle 20. The deceleration control will be explained below on the basis of FIG. 5.

At first, in S101, it is judged whether or not the internal combustion engine 1 is in a state in which the load operation is performed. The load operation resides in an operation state of the internal combustion engine distinguished from the idle operation. The load operation has an operation form which is carried out corresponding to the engine load required for the internal combustion engine 1 on the basis of, for example, the accelerator operation performed by a driver of the hybrid vehicle 20 and/or the output of the auxiliary machinery. If the affirmative judgment is made in S101, the routine proceeds to S102, while if the negative judgment is made, the routine proceeds to S108. Subsequently, in S102, it is judged whether or not the internal combustion engine 1 is in the non-warm-up state. The non-warm-up state indicates such a state that the engine temperature of the internal combustion engine 1 is low, wherein the amount of the fuel adhered to the intake passage or the like of the internal combustion engine 1 is relatively increased as described above. For example, the so-called cold start state of the internal combustion engine 1 and the state before the completion of the warming-up (semi-warm-up state) are included in the non-warm-up state. Specifically, if the engine temperature of the internal combustion engine 1 is equal to or lower than a predetermined temperature which is determined on the basis of the adhered fuel amount on the intake passage or the like, it is possible to judge that the internal combustion engine 1 is in the non-warm-up state. If the affirmative judgment is made in S102, the routine proceeds to S103. If the negative judgment is made, this control is repeated from the beginning.

In S103, it is judged whether or not the required engine output for the internal combustion engine 1 (hereinafter simply referred to as "required output") Pe is smaller than the target output Petarget. The target output Petarget is the threshold value at which it is possible to judge that the negative pressure state is formed at the intake passage or the like on account of the decrease in the engine output and the evaporation of the adhered fuel is conspicuous. Further, the target output Petarget is also the threshold value which is provided in order that the operation of the internal combustion engine 1 is switched from the load operation to the idle operation on account of the decrease in the engine output. Therefore, if the required output Pe is smaller than the target output Petarget, the switching is performed from the load operation to the idle operation. If the situation is reverse to the above, the switching is performed from the idle operation to the load operation (see the process of S109 described later on). If the affirmative judgment is made in S103, then the routine proceeds to S104, and the operation of the internal combustion engine 1 is switched therein from the load operation to the idle operation. On the other hand, if the negative judgment is made in S103, this control is repeated from the beginning.

If the switching to the idle operation is performed in S104, it is thereafter judged in S105 whether or not the value of the variation amount of the output per unit time in the decrease in the required output Pe, i.e., the required output decrease speed (as the parameter to mean that the larger the value of the speed is, the more suddenly the required output decreases) DPe exceeds a predetermined decrease speed DPetarget. The predetermined decrease speed DPetarget is the threshold value in relation to the engine output decrease speed of the internal combustion engine 1 at which the evaporation amount of the adhered fuel is suddenly increased on account of the sudden decrease in the required output and the excessively rich air-fuel ratio of the air-fuel mixture may arise in the internal combustion engine 1. Therefore, if the affirmative judgment is made in S105, it is meant that the excessively rich air-fuel ratio of the air-fuel mixture is feared. Accordingly, the process proceeds to S106. On the other hand, if the negative judgment is made in S105, it is meant that the excessively rich air-fuel ratio of the air-fuel mixture is not feared. Accordingly, the process proceeds to S107.

Subsequently, in S106, the opening degree of the throttle valve 13 during the idle operation is set to a predetermined increased opening degree, and the electricity storage control during deceleration is performed. Details of the process of S106 will be explained below. In the idle operation of the internal combustion engine 1, the opening degree of the throttle valve 13 is adjusted so that the intake amount, which is conform to the combustion of the fuel to such an extent that the engine rotation speed can be maintained, is supplied. The opening degree of the throttle valve 13, which is provided in this situation, is referred to as "standard opening degree". In this context, when the internal combustion engine 1 is switched to perform the idle operation after undergoing a predetermined deceleration state, if the opening degree of the throttle valve 13 is the standard opening degree, then the predetermined negative pressure state is formed at the intake passage or the like, and hence it is feared that the air-fuel ratio of the air-fuel mixture may become excessively rich in the internal combustion engine 1 as described above. In view of the above, the opening degree, which is set as the opening degree increased to the opening side as compared with the standard opening degree in order to dissolve the predetermined negative pressure state, is the "predetermined increased opening degree" described above. Therefore, when the opening degree of the throttle valve 13 is set to the predetermined increased opening degree, the opening degree of the throttle valve 13 is the opening degree on the opening side as compared with the opening degree to be intrinsically provided during the idle operation (i.e., the standard opening degree). Therefore, the negative pressure in the intake passage or the like is mitigated, and thus the evaporation of the adhered fuel is suppressed.

On the other hand, when the opening degree of the throttle valve 13 is set to the predetermined increased opening degree, the intake gas, which is in an amount larger than the amount to be intrinsically supplied during the idle operation, is supplied to the internal combustion engine 1. The internal combustion engine 1 is the gasoline engine. Therefore, the engine output of the internal combustion engine 1 is increased as a result of the adjustment of the fuel injection amount so that the air-fuel ratio of the air-fuel mixture is approximately in the vicinity of the stoichiometric air-fuel ratio. Accordingly, in this example, the engine output, which is increased corresponding to the increase amount provided when the opening degree of the throttle valve 13 is increased from the standard opening degree to the predetermined increased opening degree, is transmitted to the motor 21b to generate the electric power therein in accordance with the electricity storage control during deceleration as described above, and the generated electric power is stored in the battery 32 by the aid of PCU 31. Accordingly, it is possible to maintain the engine output suitable for the idle operation of the hybrid vehicle 20, while avoiding the formation of any excessively rich air-fuel ratio of the air-fuel mixture in the internal combustion engine 1. After the process of S106, this control is repeated from the beginning.

In S107, based on the fact that it is judged that there is no fear of the formation of any excessively rich air-fuel ratio of the air-fuel mixture, the opening degree of the throttle valve 13 is set to the standard opening degree. In this case, the increase in the engine output of the internal combustion engine 1 is not caused as well, which would be otherwise caused by the increase in the throttle valve opening degree described above. Therefore, the electricity storage control during deceleration is stopped. After the process in S107, this control is repeated from the beginning.

Subsequently, an explanation will be made about the flow of the process if the negative judgment is made in S101 and the routine proceeds to S108. In S108, it is judged whether or not the internal combustion engine 1 is in a state in which the idle operation is performed. If the affirmative judgment is made in S108, the routine proceeds to S109, while if the negative judgment is made, this control is repeated from the beginning. In S109, it is judged whether or not the required output Pe for the internal combustion engine 1 reaches at the target output Petarget. That is, it is judged whether or not the situation requiring the operation of the internal combustion engine 1 is to be switched to the load operation in the state in which the internal combustion engine 1 performs the idle operation exists. If the affirmative judgment is made in S109, the routine proceeds to S111, while if the negative judgment is made, the routine proceeds to S110.

Subsequently, in S110, it is judged whether or not the situation requiring the battery 32 to be protected so that the battery 32 is not in an overcharge state. For example, if the electric power amount (for example, the generated electric power by the engine output of the internal combustion engine 1 and the deceleration regenerative electric power), which is generated by the motor 21b corresponding to the operation of the internal combustion engine 1, exceeds an allowable charge amount Win as the index to avoid the overcharge of the battery 32, then it is feared that the overcharge may arise, and hence it is necessary to avoid the charge in order to protect the battery 32. The allowable charge amount Win is grasped by ECU 30 by the aid of PCU 31 as the difference between the stored electric power amount to be provided in the full charge state of the battery 32 and the present stored electric power amount. If the affirmative judgment is made in S110, the routine proceeds to S111, while if the negative judgment is made, this control is completed.

In S111, the operation of the internal combustion engine is switched from the idle operation to the load operation. Accordingly, the opening degree of the throttle valve 13 is controlled to the opening degree corresponding to the required output required for the internal combustion engine 1. Further, in S112 to be performed thereafter, the electricity storage control during deceleration is stopped.

Figure 5:
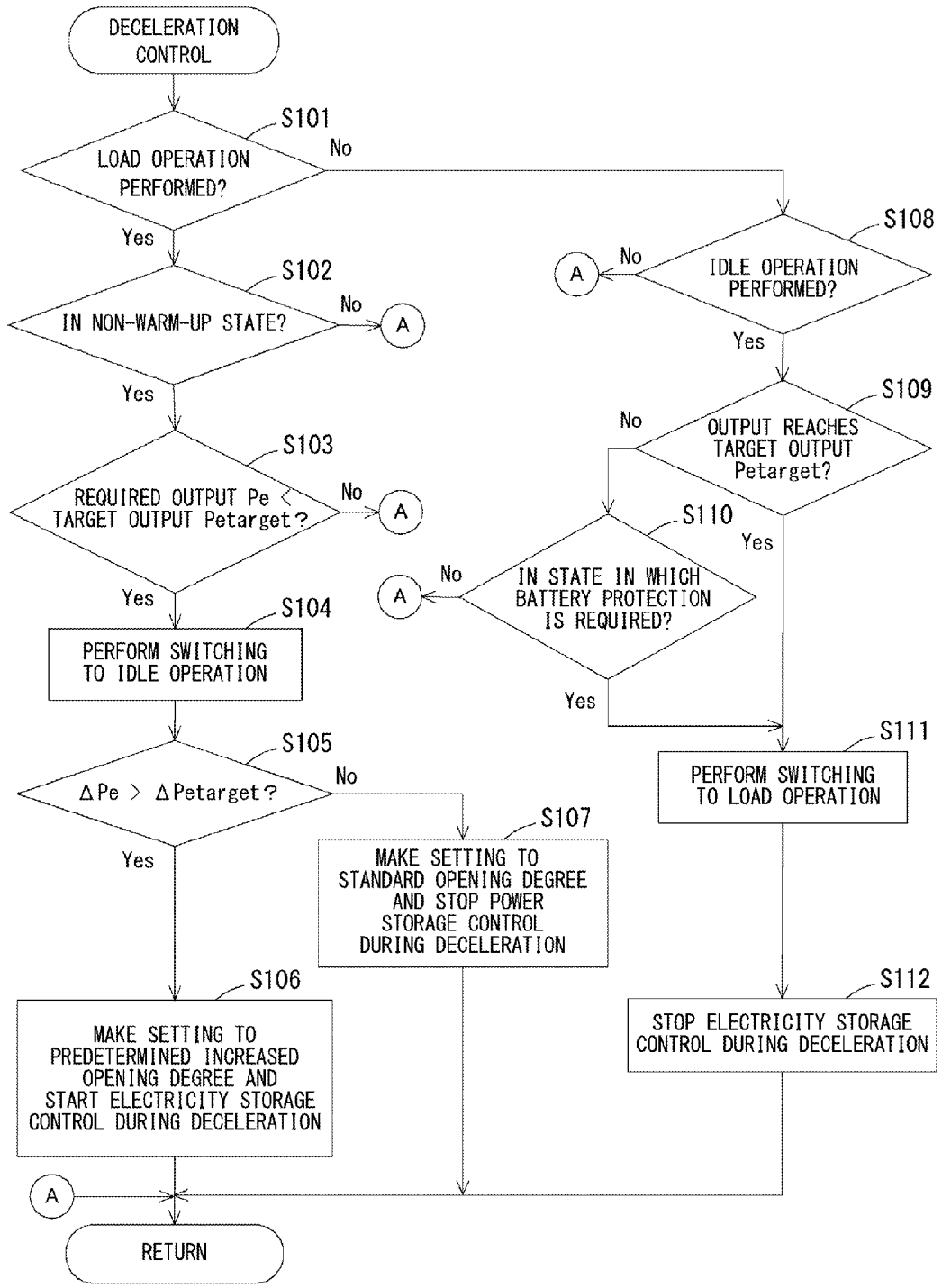
FIG. 5 shows a flow chart in relation to the deceleration control to be executed during the deceleration of the internal combustion engine by the control apparatus for the internal combustion engine shown in FIG. 2.
Figure 6:
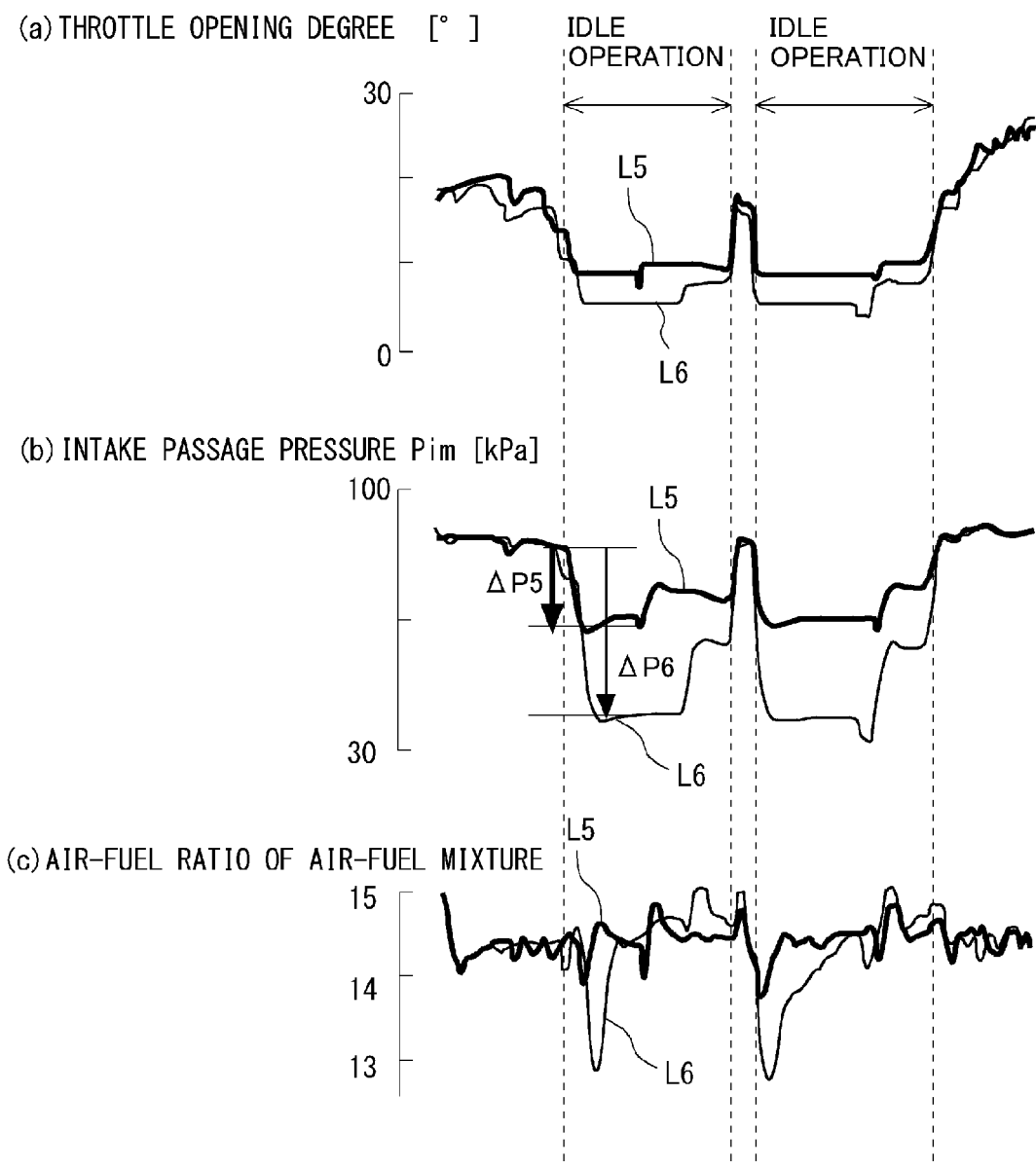
FIG. 6(a) to FIG. 6(c) show the transition of the opening degree of a throttle valve, the transition of the pressure in an intake passage, and the transition of the air-fuel ratio of the air-fuel mixture in the internal combustion engine, respectively, when the deceleration control shown in FIG. 5 is performed.

As described above, according to the deceleration control shown in FIG. 5, if the excessively rich air-fuel ratio of the air-fuel mixture is feared on account of the deceleration operation of the internal combustion engine 1, the opening degree of the throttle valve 13 is adjusted to the predetermined increased opening degree. Accordingly, the internal negative pressure state of the intake passage or the like is mitigated, and the variation of the engine output, which is generated by the increase in the amount of the intake gas, is absorbed by the charging to the battery 32 in accordance with the electricity storage control during deceleration. Therefore, as a result, it is possible to establish both of the suppression of the formation of the excessively rich air-fuel mixture and the stabilization of the output of the internal combustion engine. FIG. 6(a) to FIG. 6(c) show the transition of the opening degree of the throttle valve 13, the transition of the pressure in the intake passage or the like, and the transition of the air-fuel ratio of the air-fuel mixture, respectively, when the deceleration control is performed as described above. In FIG. 6(a) to FIG. 6(c), a line L5 indicates the transition of each parameter provided when the deceleration control is performed, and a line L6 indicates the transition of each parameter provided when the deceleration control is not performed, i.e., when the control is performed in accordance with the conventional technique. As clearly understood from the transitions as well, during the idle operation in which the opening degree of the throttle valve 13 is increased to the opening side in accordance with the deceleration control, the pressure variation DP5 in the negative pressure direction provided in this situation is mitigated as compared with the pressure variation DP6 in the negative pressure direction provided when the deceleration control is not performed, and the variation amount of the air-fuel ratio of the air-fuel mixture, especially the variation amount toward the rich side is decreased.

Modified Example 1

Figures 7, 8:
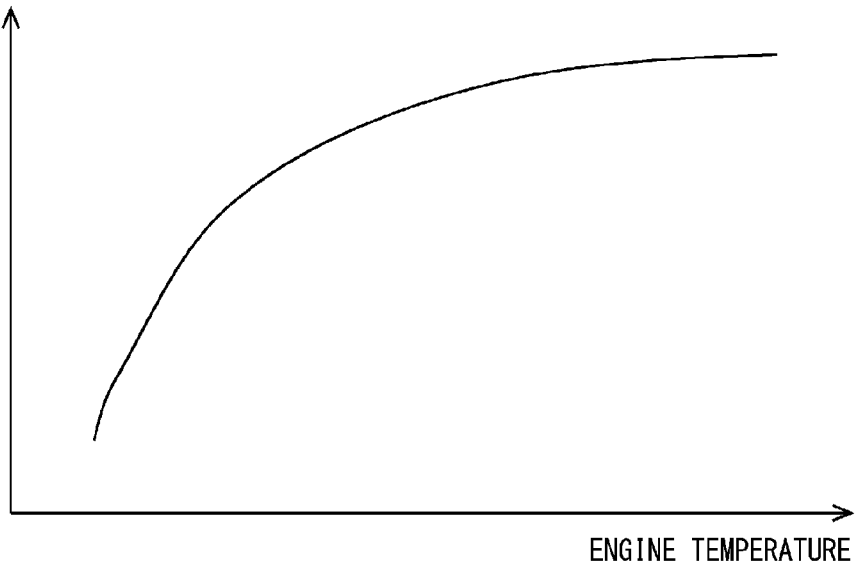
FIG. 7 shows a correlation between the predetermined decrease speed and the engine temperature to be used in the deceleration control shown in FIG. 5.
FIG. 8 shows a correlation between the allowable charge amount and the predetermined engine output to be used in the deceleration control shown in FIG. 5.

In the deceleration control described above, it is also allowable that the predetermined decrease speed DPetarget is changed depending on the engine temperature of the internal combustion engine 1. There is such a tendency that the lower the engine temperature of the internal combustion engine 1 is, the more increased the amount of the fuel adhered to the inner wall surface of the intake passage or the like is. Further, the more increased the adhered fuel is, the more increased the amount of evaporation of the fuel caused by the negative pressure is. In view of the above, as shown in FIG. 7, the value of the predetermined decrease speed DPetarget is decreased as the engine temperature of the internal combustion engine 1 is more lowered. Accordingly, the affirmative judgment is made more easily in S105 as the engine temperature of the internal combustion engine 1 is more lowered. Thus, the mitigation of the negative pressure is facilitated in the intake passage or the like, and it is possible to appropriately avoid the formation of any excessively rich air-fuel ratio of the air-fuel mixture.

Modified Example 2

Figure 9:
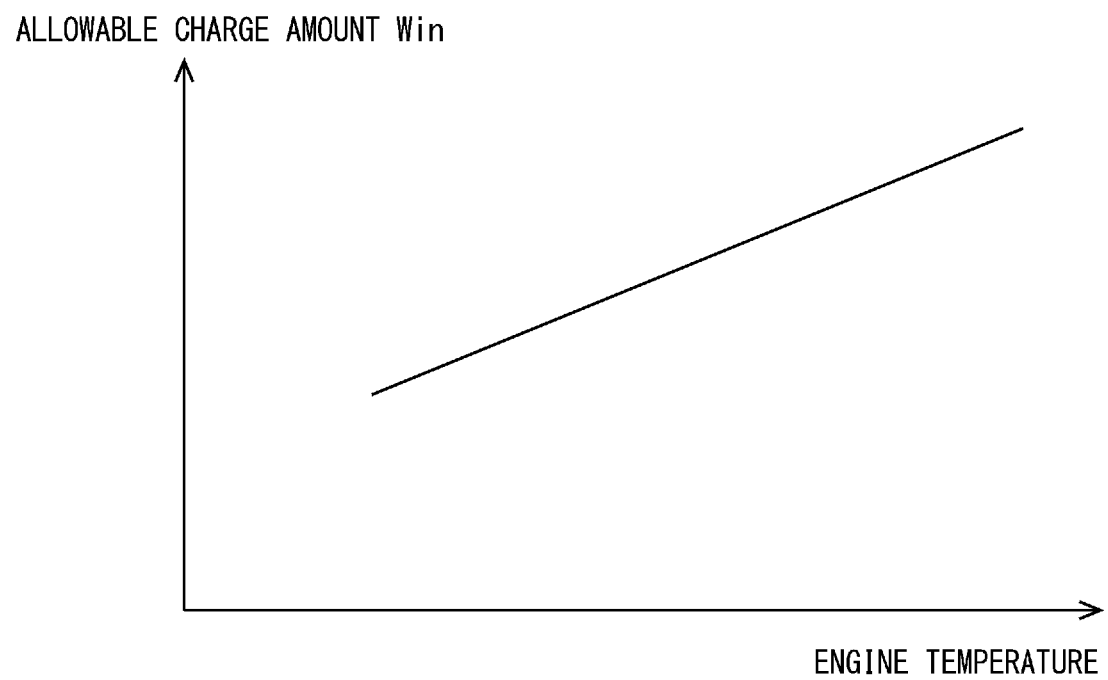
FIG. 9 shows a correlation between the allowable charge amount of a battery and the engine temperature.

The battery 32, which is mounted in the hybrid vehicle 20, has the electricity storage characteristic which is to be changed in some cases by being affected by the influence of the circumferential environment. For example, there is such a tendency that the higher the temperature of the battery 32 is, the more enhanced the electricity storage performance is. Therefore, when the arrangement is made such that the temperature of the battery 32 correlates with the engine temperature of the internal combustion engine 1, a characteristic appears such that the allowable charge amount Win is also increased as the engine temperature is more raised as shown in FIG. 9. When the allowable charge amount Win is varied by being affected by the influence of the external environment as described above, the target output Petarget may be changed in the deceleration control depending on the allowable charge amount Win. FIG. 8 shows the correlation between the target output Petarget and the allowable charge amount Win.

The larger the allowable charge amount Win is, the more increased the margin or allowance is in order that the engine output, which is increased by setting the opening degree of the throttle valve 13 to the predetermined increased opening degree, is stored as the electric energy in the battery 32. This fact makes it possible to suppress the formation of any excessively rich air-fuel ratio of the air-fuel mixture as far as possible by increasing the opportunity to set the opening degree of the throttle valve 13 to the predetermined increased opening degree in accordance with the deceleration control as described above. In view of the above, as shown in FIG. 8, it is also appropriate to perform the adjustment such that the larger the allowable charge amount Win is, the larger the target output Petarget is. Accordingly, it is possible to preferably establish both of the suppression of the formation of the excessively rich air-fuel mixture by the deceleration control described above and the stabilization of the output of the internal combustion engine, while appropriately protecting the battery 32.

In this context, when the predetermined engine output Petarget is adjusted depending on the allowable charge amount Win, it is preferable to set the upper limit value Pemax and the lower limit value Pemin of the target output Petarget in accordance with the following viewpoint. In the deceleration control described above, the charge amount to the battery 32 is increased by setting the opening degree of the throttle valve 13 to the predetermined increased opening degree, and the fuel efficiency of the internal combustion engine 1 is consequently improved. However, on the other hand, the fuel injection amount (i.e., the direct fuel consumption amount) is also increased on account of the increase in the opening degree of the throttle valve 13. In order to entirely improve the fuel efficiency of the internal combustion engine 1, it is preferable that the engine output is large to some extent. Accordingly, it is preferable to set the lower limit value Pemin of the target output Petarget in view of the improvement in the fuel efficiency of the internal combustion engine 1 (see FIG. 8).

Figure 10:
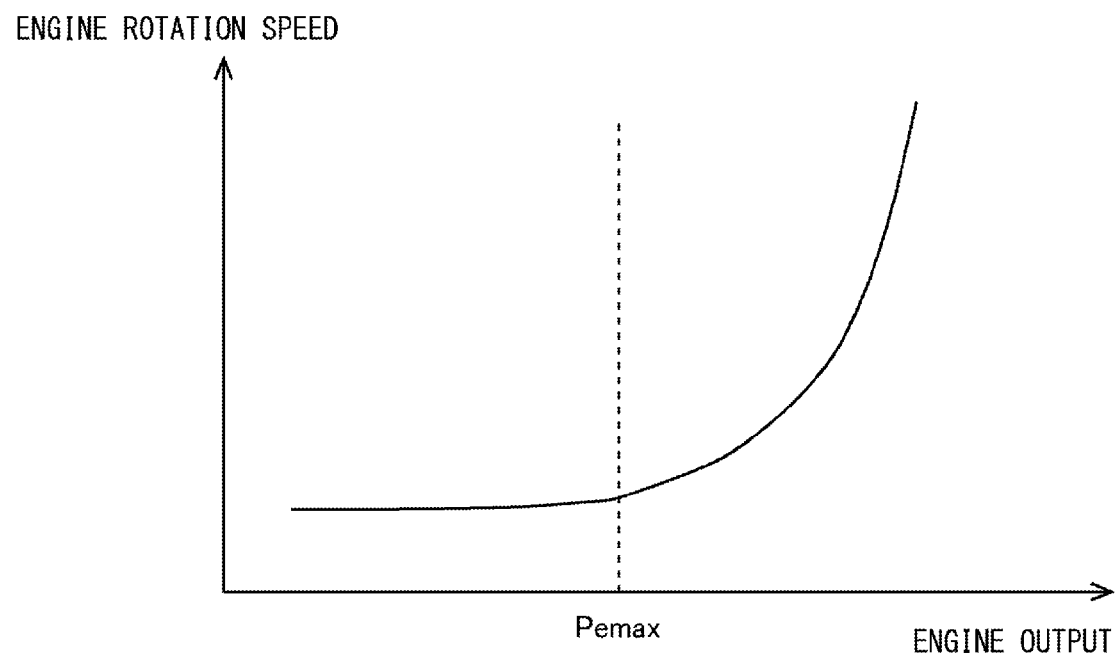
FIG. 10 shows a correlation between the engine rotation speed and the engine output provided to calculate the maximum value of the predetermined engine output set in the deceleration control shown in FIG. 5.

On the other hand, as shown in FIG. 10, in the case of the deceleration control described above, when the opening degree of the throttle valve 13 is set to the predetermined increased opening degree, the racing is caused in some cases such that the engine output of the internal combustion engine 1 is raised and the engine rotation speed is suddenly raised. This phenomenon arises when the increase amount of the engine output exceeds the absorption of the increase amount of the engine output by the motor 21b, i.e., the power generation ability. Accordingly, it is preferable to set the upper limit value Pemax of the predetermined engine output Petarget in view of the suppression of the racing, while considering the power generation ability of the motor 21b (see FIG. 8).

The modified example described above has been explained on the assumption that the allowable charge amount Win is changed in relation to the engine temperature as shown in FIG. 9. However, based on the fact that the allowable charge amount Win is also changed depending on any other factor, for example, the degree of deterioration of the battery 32, without being limited to only the engine temperature, the target output Petarget may be set depending on the allowable charge amount Win as described above.

Example 2

In the deceleration control shown in the first example described above, the opening degree of the throttle valve 13 is set to the predetermined increased opening degree in S105. However, in this example, the predetermined increased opening degree is adjusted depending on the allowable charge amount Win of the battery 32. Specifically, when the allowable charge amount Win is smaller, the predetermined increased opening degree is adjusted to the opening degree on the more closing side (that is, the predetermined increased opening degree is made smaller). As a result, the degree of mitigation of the negative pressure state in the intake passage or the like is decreased. However, it is possible to decrease the increase range of the engine output brought about by providing the predetermined increased opening degree for the opening degree of the throttle valve 13. It is possible to safely perform the charging of the generated electric power generated by the motor 21 to the battery 13. In this case, the change speed of the opening degree of the throttle valve 13, which is brought about to achieve the adjusted predetermined increased opening degree in S105, is made slower (smaller) when the allowable charge amount Win is smaller. Accordingly, it is possible to stably maintain the engine output of the internal combustion engine 1 while suppressing the evaporation of the adhered fuel.

Example 3

In the deceleration control shown in the example as described above, when the internal combustion engine 1 is subjected to the deceleration operation, and the operation is changed from the load operation to the idle operation, then the opening degree of the throttle valve 13 is set to the predetermined increased opening degree, and the electricity storage control during deceleration is performed. In place of this example, it is also allowable that the opening degree of the throttle valve 13 is set to the predetermined increased opening degree, and the electricity storage control during deceleration is performed during the deceleration in which the internal combustion engine 1 performs the load operation as well. The predetermined increased opening degree, which is to be adopted in this case, is defined as the opening degree increased from the "standard opening degree" corresponding to the required output intrinsically required for the internal combustion engine 1 depending on the load during the deceleration. Further, the target output Petarget is defined as the output at which the negative pressure state may be formed such that the evaporation of the adhered fuel is conspicuous, in relation to the pressure in the intake passage or the like during the deceleration. The predetermined decrease speed DPetarget is defined as the threshold value in relation to the engine output decrease speed of the internal combustion engine 1 at which the required output is suddenly lowered, the evaporation amount of the adhered fuel is suddenly increased thereby, and the formation of any excessively rich air-fuel ratio of the air-fuel mixture may be caused in the internal combustion engine 1, in the same manner as in the example described above.

REFERENCE SIGNS LIST

1: internal combustion engine
2: cylinder

3: spark plug
4: intake port
8: fuel injection valve
10: crank position sensor
11: accelerator position sensor
12: intake passage
13: throttle valve
16: exhaust passage
20: hybrid vehicle
21a, 21b: motor (motor generator)
30: ECU
31: PCU
32: battery
35: electric heating catalyst (EHC)

The invention claimed is:

1. A control apparatus for an internal combustion engine having a generator which generates electric power by using an output of the internal combustion engine and a electricity storage apparatus which stores the electric power generated by the generator, the control apparatus for the internal combustion engine comprising:
a temperature sensor which acquires a temperature of the internal combustion engine;
a controller comprising at least one processor configured to control an opening degree of a throttle valve provided in an intake passage of the internal combustion engine; wherein:
the controller controls, if a variation amount of decrease in output of the internal combustion engine exceeds a predetermined variation amount when the output of the internal combustion engine is smaller than a predetermined output in a non-warm-up state in which the temperature of the internal combustion engine acquired by the temperature acquiring unit is equal to or lower than a predetermined temperature, an opening degree of the throttle valve to a predetermined increased opening degree which is increased as compared with a standard opening degree as an opening degree of the throttle valve to be provided when the variation amount does not exceed the predetermined variation amount; and
the controller stores the electric power generated by the generator in the electricity storage apparatus corresponding to increase in output of the internal combustion engine based on an amount of increase from the standard opening degree to the predetermined increased opening degree.

2. The control apparatus for the internal combustion engine according to claim 1, wherein:
the predetermined output is an engine output which is provided as a threshold value to switch a load operation and an idle operation in the internal combustion engine; and
the predetermined increased opening degree is an opening degree increased as compared with the standard opening degree, the standard opening degree being an opening degree of the throttle valve during the idle operation of the internal combustion engine provided when the variation amount of the decrease in output of the internal combustion engine does not exceed the predetermined variation amount.

3. The control apparatus for the internal combustion engine according to claim 1, wherein:
the generator is a motor which is capable of generating the electric power by using the output of the internal combustion engine and which is capable of outputting a driving force by supplying the electric power stored in the electricity storage apparatus; and
the internal combustion engine is mounted in a hybrid vehicle having the internal combustion engine and the motor as driving sources.

4. The control apparatus for the internal combustion engine according to claim 1, wherein:
the controller acquires, as an allowable charge amount, an electric power amount capable of being charged in the electricity storage apparatus, and
the smaller the allowable charge amount acquired, the smaller the predetermined increased opening degree the controller adjusts is, and the lower the change speed of the throttle valve opening degree to arrive at the adjusted predetermined increased opening degree the controller makes is.

* * * * *